United States Patent [19]

Laine et al.

[11] 4,392,987

[45] Jul. 12, 1983

[54] ALUMINA SPHEROIDS WITH CONTROLLED SMALL PARTICLE SIZE AND A PROCESS FOR PRODUCING THEM

[75] Inventors: Norman R. Laine, Rockville; Jose E. Herrera, Ellicott City, both of Md.

[73] Assignee: W. R. Grace & Co., New York, N.Y.

[21] Appl. No.: 335,781

[22] Filed: Dec. 30, 1981

[51] Int. Cl.³ .............................................. B01J 35/08
[52] U.S. Cl. .................................... 252/448; 252/463
[58] Field of Search ................. 252/448, 463; 423/628

[56] References Cited

U.S. PATENT DOCUMENTS

| | | | |
|---|---|---|---|
| 2,746,934 | 5/1956 | Richardson et al. | 252/448 |
| 4,116,882 | 9/1978 | Bendig et al. | 252/448 |
| 4,169,874 | 10/1979 | Bambrick | 264/44 |
| 4,179,408 | 12/1979 | Sanchez et al. | 252/448 |
| 4,198,318 | 4/1980 | Stowell et al. | 252/448 |

Primary Examiner—W. J. Shine
Attorney, Agent, or Firm—Edward J. Cabic

[57] ABSTRACT

Small size alumina particles of controlled sizes suitable for use as a catalyst support can be made from an acidified alumina slurry by spraying under nonatomizing conditions from a nozzle with a gas or inert fluid used to disperse the slurry into small droplets. The droplets can either be sent through an ammoniated kerosene column or the acidified slurry can be spray dried. Small alumina spheroids are produced, which after calcination, have controlled size diameters from about 0.01 mm. to about 2.0 mm.

17 Claims, No Drawings

ALUMINA SPHEROIDS WITH CONTROLLED SMALL PARTICLE SIZE AND A PROCESS FOR PRODUCING THEM

BACKGROUND OF THE INVENTION

1. Field of the Invention

This invention relates to a method for producing very small size alumina spheroids utilizing air or some other immiscible fluid either in a gaseous or liquid form.

2. Description of the Previously Published Art

The Sanchez et al patent U.S. Pat. No. 4,179,408 discloses a method for forming alumina spheroids. An acidified alumina slurry is obtained with an alumina and this slurry is sent through dripping nozzles where the alumina slurry forms a droplet at the end of the nozzle. As the droplet grows large, it reaches a diameter on the order of 4–7 mm. at which point its weight causes it to fall from the nozzle. It then passes through air and into an ammoniated kerosene-containing column. As the droplet passes through this column it is formed into a spheroidal particle and hardens.

The particles obtained by this technique are of a generally large size having diameters of about 3 mm. or larger after they have been calcined.

3. Objects of the Invention

It is an object of this invention in one embodiment to use the basic alumina spheroid production technique disclosed in the Sanchez et al U.S. Pat. No. 4,179,408 and to make smaller size particles in a controlled manner where the diameter can be controlled to form particles which after being calcined have diameters from about 0.05 mm. to about 3.0 mm.

It is a further object of this invention to produce small size alumina spheroids with good crush strength and good attrition resistance.

It is a further object to produce not only small size particles, but to increase the number of droplets per unit time so as to increase the volume throughput.

It is a further object to produce small alumina spheroids suitable for catalyst support use having diameters of about 3 mm. or less.

It is a further object to have an effective spray dry process to produce spheroidal alumina particles which after being calcined have a controlled size within the diameter range of about 0.01 mm. to about 0.40 mm.

These and further objects of the invention will become apparent as the description of the invention proceeds.

SUMMARY OF THE INVENTION

The present invention relates to an improvement in the spheroidal particle forming process of the Sanchez et al U.S. Pat. No. 4,179,408 by using air or other similar inert gas or an immiscible fluid to prevent the formation of large alumina slurry droplets at the end of a dripping nozzle prior to these droplets falling off into an ammoniated kerosene-containing column according to the procedure described in the Sanchez et al patent.

The spray technique used to form smaller droplets utilizes a two-fluid spray nozzle. Pressurized air is inserted into the spray nozzle just inside the end of the nozzle. The air breaks up the liquid stream into discrete droplets of a small size and ejects them from the nozzle. Droplet size is affected primarily by the air flow rate. Increasing the air flow rate will decrease the droplet size. It is not the intention in this embodiment to use a high air flow rate so as to atomize the slurry into fine particles. If high spray rates were used, a fine mist or fog would be formed as a result of the atomization and this is not desired. For example, in a preferred embodiment where the liquid flow rate is about 0.8 gallons per hour, the air flow employed is of the order of 0.1 cubic feet per minute. This is about one-tenth of the air flow for atomization of the liquid. Particles formed by this technique using different air flow rates can have diameters ranging from 0.1 mm. to 3.0 mm. after being calcined and more preferably frgm 0.1 mm to 2.0 mm.

A further aspect of the invention is to use the acidified alumina slurry in a spray drier to obtain very small particles of a controlled size. The use of the acidic slurry is important in this process not only to obtain spheroids in the 0.01–0.40 mm. size range but also to obtain fully formed spheroids without cavities or cusps.

DESCRIPTION OF THE PREFERRED EMBODIMENTS

The Sanchez et al U.S. Pat. No. 4,179,408, which is incorporated herein by reference, discloses a unique alumina powder that can be acidified and fed through a droplet nozzle into a column containing first kerosene and then aqueous ammonia to form spheroidal particles. The procedure consists of forming the spheroidal alumina particles by commingling a precipitated alumina and an acidic aqueous medium to provide a slurry, forming droplets of the slurry, passing the droplets downwardly through air into an upper body of water-immiscible liquid and ammonia and into a lower body comprising aqueous ammonia to form spheroidal particles, aging the particles in aqueous ammonia, and drying and calcining the aged particles. Especially advantageous results can be obtained utilizing the equipment described in Example 8 of the patent.

The device described in Example 8 has a droplet formation nozzle with an internal diameter of 2.7 mm. which results in calcined spheroids of ⅛ inch diameter (about 3.2 mm.) on its minor axis.

For the slurry feeds described in U.S. Pat. No. 4,179,408, the lower practical limit of spheroid diameter for controlled size calcined spheroids is about 2 mm. when using very small nozzles. The droplet must grow to a weight which is heavy enough so that the gravitational forces will overcome the surface tension forces holding the droplet on the nozzle. Reducing the nozzle diameter does not cause a linearly proportionate decrease in the droplet size since the droplets tend to grow to a size larger than the nozzle opening. The gravity drop method also suffers from a lowered volume throughput as the nozzle diameter and droplet size are decreased. Although the number of drops formed per unit time remain about the same, with the production of smaller drops the total volume being produced is less.

Sizes smaller than 2 mm. after calcination can be made with the gravity drop nozzles by increasing the slurry feed pump rate until a streamer forms of an unbroken flow. However, there is no good control over the sizes of the droplets produced. Large blobs as well as extremely small spheroids will be produced and the yield of any one size will be very low.

The calcined spheroidal alumina particles made by this Sanchez et al patent have a total pore volume of about 0.8 to about 1.7 cubic centimeters per gram in pores of 100 to 1000 Angstrom units in diameter, a pore volume of about 0.1 to about 0.4 cubic centimeter per gram in pores of 1000 to 10,000 Angstrom units in diameter, a surface area of about 80 to about 135 square meters per gram, an attrition loss of less than about 5%, an average crush strength of at least about 5 pounds, and a compacted bulk density of about 20 to 36 pounds per cubic foot. The spheroids made by the instant invention have similar properties with the average crush strength given by Formula 3 infra and the compacted bulk density of about 0.32 to about 0.60 grams per cubic centimeter.

The difficulties encountered with the procedure in U.S. Pat. No. 4,179,408 with respect to small size particles can be overcome by the method of the present invention in which air or some other gas or immiscible fluid is used to blow the droplets off of the nozzle before they have grown into the large droplets which would normally fall off by gravitation.

According to the present invention, separate streams of an immiscible fluid such as air and the alumina slurry are pumped to a spray nozzle where the immiscible fluid mixes with and breaks up the alumina slurry stream. Fluid pressure within the nozzle sprays the alumina droplets into the kerosene where the droplets gel into spheroids. Droplet sizes are primarily controlled by the air flow rate. Low air flow rates will produce relatively large droplets. Increasing the air flow rate will produce smaller droplets. Decreasing the liquid flow rate will decrease the droplet size. However, in order to maintain a high volume throughput for commercial reasons, it is better to run at a high, liquid flow rate and to control droplet size by varying the air flow rate.

Standard, commercially available, spray nozzles can be used. Choice of nozzle depends upon the pumping rates and the spray pattern desired.

The distance from the spray nozzle to the kerosene was maintained at about one inch so the droplets would be separated and not interfere with each other.

High volume throughputs are possible with spray nozzles. The size and design of the spray nozzle can be varied to allow slurry flows ranging from 0.1 gallon per hour to greater than 300 gallons per hour for one nozzle. The limiting factors are the size of the spheroid column and its gelation capacity.

Although spheroids as small as 0.1 mm. can be made by this technique, practical considerations probably limit its application to the formation of spheroids larger than 60 mesh (0.25 mm.). Bouyancy of the smaller spheroids in the two phase liquid column becomes an important consideration for the smaller sizes. Also equipment for separation of the small spheroids from the liquid phase and drying them may increase the costs of the process.

To produce spheroids in the size range of 0.01 mm. to 0.40 mm. and especially from 0.1 mm. to 0.25 mm., a commercial spray drier can be used. In this embodiment a heated air column is substituted for the two phase liquid column. The use of the acidic alumina slurry constitutes the improvement over standard spray drying operations and represents an essential aspect of the invention. Standard spray driers spray solutions or water slurries of fine powders. They form particles with sizes ranging from tenths of a micron to tens of microns (0.0001 mm. to approximately 0.05 mm.). The smaller particles are spheroidal, but the larger particles are hollow spheroids such as cusps or they are irregular shapes. Spheroids formed in this manner would not have the physical integrity of spheroids formed from the acid aged slurries according to the present invention. Furthermore, particles in the size range of hundreds of microns such as greater than 0.1 mm., particularly spheroidal particles, are almost impossible to form in standard spray drier operation. To accomplish this result concentrated slurries or solutions having greater than 20% solids are required and these are difficult to obtain and pump in standard water based systems.

Using an acidified alumina slurry in combination with the spray drier yields two significant advantages. The alumina solids become partially peptized and are thus fluid enough to be readily pumped and sprayed at solids concentrations greater than 20%. Thus, particles in the 0.01 mm. to 0.40 mm. diameter range can readily be obtained by spray drying according to the present invention. In addition, peptization of the alumina provides a means of forming alumina-alumina interparticle bonding among the fine alumina particles constituting the slurry. This produces cohesive forces within the spray droplets which act to retain the spheroidal shape of the droplet as it dries. Thus, particles are obtained which are both larger and more spheroidal than those obtained by standard spray drying techniques. For these large pore volume containing particles, the peptization process also insures that the particles have good crush strength and attrition resistance.

The spray drier can especially be used to make spheroids in the 0.05–0.25 mm. size range (0.002–0.01 inches). Factors controlling spheroid size are the air and slurry feed rates and slurry solids concentration. The use of high air pressure with the resulting higher air flows or high slurry feed rates result in smaller sizes. Dilute slurries also give smaller sizes than concentrated slurries.

The crush strength of the spheroids is dependent on their size and density. Generally, the larger the particle and the greater its density, the greater its crush strength will be. This relationship may be conveniently expressed through an equation such as Equation 1 below:

$$ACS \geq k'dS \tag{1}$$

in which:
  ACS is the average crush strength in kilograms force,
  d is the compacted bulk density in grams/cm.$^3$,
  S is the average cross-sectional surface area in cm.$^2$, and
  k' is a proportionality factor.

Since the cross-sectional surface area, S, may be expressed by:

$$S = \pi r^2 \tag{2}$$

in which r is the average radius of the spheroids in cm. and $\pi$ has its customary meaning (3.14 . . . ). It is possible to substitute this relationship into Equation 1 to obtain the final relationship expressed by Equation 3 below where K is an overall strength factor:

$$ACS \geq Kdr^2 \tag{3}$$

The spheroids made by the spray nozzle embodiment have a value for the strength factor, K, of at least 250, with a more preferred value of greater than 300 and with the most preferred value of greater than 350.

For very small particles, generally less than 0.05 mm. in diameter, the measurement of absolute crush strength is very difficult to perform. Experimental results may be meaningless because of the error in the measuring technique. However, these very small spheroids are mostly used in dynamic applications involving fluid beds where a gas is suspending the particles, ebullient beds where a liquid is suspending the particles, moving beds, and the like in which the particles are not subjected to crushing forces. In these systems the average crush strength is of little or no significance while the mechanical property of great significance is the attrition resistance. In these catalyst applications, it is very important to have particles which can survive the impacts and collisions which occur as they contact each other and the walls of the container during use.

The products of the instant invention exhibit very good attrition properties even in those cases where the density is quite low. The small spheroids made according to the present methods have good attrition loss properties with an attrition loss of less than 5% and the preferred embodiments with a loss of less than 2% and most preferably less than 1%. The low attrition loss exhibited by the spheroids is a direct consequence of their shape and strong structure. The smooth surface will not attrit as readily as irregular surfaces which exhibit corners and/or edges. Also, the gelation process produces a coherent uniform particle rather than a layered particle which results from some mechanical balling processes. A mechanically formed particle may delaminate during an attrition process. The method used to measure attrition resistance is basically that described in the Sanchez et al U.S. Pat. No. 4,179,408. However, the method is modified as described in Example 5 herein to handle the small diameter products.

The small spheroids made by the process of this invention can serve as catalyst supports. For example, catalysts can be made from the present small spheroids by the procedure given in Example 11 of the Sanchez et al U.S. Pat. No. 4,179,408. Using the spheroid forming procedures of the present invention, small calcined spheroids having diameters from about 0.01 mm. to 3 mm., more preferably of about 0.01 to about 2 mm. and even more preferably from about 0.05 to 2 mm. can be obtained. These spheroids, being made from the same alumina powder disclosed in this patent form spheroids with similar physical properties. As described in column 20 of the patent, these spheroidal alumina particles, when calcined, can have a total pore volume of about 0.8 to about 1.7 cubic centimeters per gram, a pore volume of about 0.5 to about 1.0 cubic centimeters per gram in pores of 100 to 1000 Angstrom units in diameter, a pore volume of about 0.1 to about 0.4 cubic centimeters per gram in pores of 1000 to 10,000 Angstrom units in diameter, a surface area of about 80 to about 135 square meters per gram, an attrition loss of less than about 5%, an average crush strength of at least about 5 pounds, and a compacted bulk density of about 20 to 36 pounds per cubic foot. The spheroids made by the instant invention have similar properties with the average crush strength given by Formula 3 supra and the compacted bulk density of about 0.32 to about 0.60 gram per cubic centimeter.

The enhanced catalytic performance of smaller sized spheres can be advantageously seen from a paper by M. V. Ernest and G. Kim, *Society of Automotive Engineers*, Paper No. 800083, February 1980. The authors found that catalytic oxidation of hydrocarbons was strongly controlled by pore diffusion. They found that increasing the geometric surface area of alumina spheres per unit volume, by decreasing sphere size, increased the durability of the catalysts. Catalyst poisons which accumulate over a period of time are spread over a larger area and their effective concentration is decreased.

Having described the basic aspects of our invention, the following examples are given to illustrate specific embodiments thereof.

EXAMPLE 1

This example illustrates the use of the atomizing spray nozzle in combination with the kerosene column to form small spheroids of controlled sizes by varying the air flow rate.

An alumina slurry was made of a microcrystalline boehmite-pseudoboehmite intermediate prepared according to the Sanchez et al U.S. Pat. No. 4,179,408 as described in Example 1. Each sample was made by mixing 30 mole batches of alumina with 0.06 moles of nitric acid per mole of alumina and 0.12 moles of acetic acid per mole of alumina with a Cowles blender for 40 minutes at 3500 RPM. Runs A, B, and C, of Table 1, were mixed at 26.3, 30.7, and 30.5% solids respectively. Portions of these large slurry batches were pumped through a spray nozzle manufactured by Spraying Systems Company to give the results shown in runs A, B, and C of Table 1. The nozzle is identified as their #1/4 JCO nozzle assembly with a #2050 fluid cap and #70 air cap. The slurry stream was broken up by air in the nozzle and sprayed into a 3" diameter column containing 8 inches of aqueous ammonia on the bottom and 4 inches of ammoniated kerosene on top.

Three spheroid forming runs are described below in Table 1 where the slurry feed rate was held constant and the air flow rate was varied. The properties of the spheroids obtained after calcination at 1900° F. for 1 hour are also listed in Table 1.

TABLE 1

| Run | A | B | C |
|---|---|---|---|
| Slurry Viscosity (cps) | 600 | 300 | 500 |
| Slurry Feed Rate (cm.$^3$/min.) | 48 | 48 | 48 |
| Air Flow Rate at 5 psig (liters/min.) | 5.5 | 6.6 | 9.0 |
| Sphere Properties after 1900° F. calcination for 1 hour | | | |
| Bulk Density (lb./ft.$^3$) | 26.3 | 26.8 | 27.1 |
| Size Distribution (w/o) | | | |
| Mesh Size — Diameter Range (mm.) | | | |
| +8 — +2.38 | 5 | 0 | 0 |
| −8+10 — −2.38 + 2.00 | 17 | 0 | 0 |
| −10+14 — −2.00 + 1.41 | 62 | 3 | 0 |
| −14+20 — −1.41 + 0.841 | 10 | 15 | 0 |
| −20−40 — −0.841 + 0.420 | 4 | 60 | 37 |
| −40+60 — −0.420 + 0.250 | 0.5 | 16 | 25 |
| −60 — −0.250 | 0.5 | 7 | 38 |

The results show that a tight distribution of particle sizes was obtained by varying the linear flow rate of the air especially within the size range of about 1.4 mm. to 2 mm. for Run A where over 60% of the particles were in this narrow range and within the size range of about 0.4 mm. to 0.8 mm. for Run B. where again 60% of the particles were in this narrow range. In run C, an appreciable fraction of particles smaller than 0.25 mm. were obtained. This includes particles smaller than 0.1 mm. (100 microns). A qualitative sieve analysis showed that there were some particles smaller than 0.074 mm. This shows the close control of particle size that is possible by this technique by controlling the air-slurry linear ratio. For this technique, viscosities in the range of 300–600 cps are essentially the same. The slurries were all very fluid.

EXAMPLE 2

This example illustrates the use of a spray nozzle to form small spheroids in the relatively larger size range of −8 +12 by using a lower air flow rate.

An alumina spheroid forming slurry was made by mixing 15 moles on a dry basis of alumina powder with 0.9 moles nitric acid and 1.8 moles acetic acid and sufficient water to give 28.0 weight percent solids. The slurry was mixed with a Cowles blender at about 3500 RPM for 40 minutes. The alumina powder used was a microcrystalline boehmite-pseudoboehmite intermediate prepared according to the Sanchez et al U.S. Pat. No. 4,179,408 as described in Example 1. The acidic alumina slurry was aged for 180 minutes. A viscosity of 285 centipoise was obtained with a solids concentration of 28.3%.

This slurry was pumped to the same spray nozzle as disclosed in Example 1. The air flow rate was reduced to make larger particles. The tip of the spray nozzle was 1 inch from the liquid kerosene, the slurry feed rate was 50 ml./minute and the air flow to the nozzle was 2 liters/minute at 2–5 psig. The slurry was sprayed into the spheroid forming column described in Example 8 of the Sanchez et al U.S. Pat. No. 4,179,408.

The spheroids were collected, dried, and calcined at 1900° F. for one hour. Characterization of the product is given in Table 2.

This example illustrates how alumina spheroids of a given size, 2.0+0.5 mm., can be maximized by controlling the air flow rate.

EXAMPLE 3

In this example, all spheroids were made by a spray drying process.

An acidic alumina slurry was made by the same process as Example 2 and aged until it had a viscosity of 500 cps and a solids content of 27%. It was then spray dried in a Bowen Corporation, Laboratory Spray Drier. This device has a concurrent air flow, a 30-inch diameter chamber, and a height of 5 feet. Major variables controlling particle size at this slurry solid concentration were the atomizing air pressure, and the slurry feed rate. The results of the six runs are set forth in Table 3.

TABLE 3

Small Spheres Produced by Spray Drying Alumina Slurries

| | Spray Drying Conditions | | | | Size Distribution (weight percent) | | | | Bulk Density |
|---|---|---|---|---|---|---|---|---|---|
| Run | Atomizing Air Pressure psig | Slurry Feed Rate g/min. | Inlet Temp. °F. | Mesh: mm: | −40+60 (0.42–0.25) | −60+100 (0.25–0.149) | −100+200 (0.149–0.074) | −200 (0.074) | After 3 hrs. at 1000° F. (g/cm³) |
| 3-1 | 15 | 220 | 500 | | 6 | 32 | 47 | 15 | 0.41 |
| 3-2 | 5 | 220 | 500 | | 19 | 33 | 31 | 17 | — |
| 3-3 | 5 | 310 | 500 | | 28 | 48 | 14 | 10 | — |
| 3-4 | 5 | 360 | 500 | | 29 | 38 | 25 | 8 | — |
| 3-5 | 5 | 310 | 600 | | 32 | 42 | 20 | 6 | — |
| 3-6 | 5 | 360 | 600 | | 53 | 27 | 13 | 7 | — |

In the relatively narrow range of temperatures employed, there was no effect of temperature noted.

EXAMPLE 4

In this example small spheroids are again made by a spray drying process with a slurry having a lower solids concentration.

Using the procedure and spray drier of Example 3, a similar slurry was used except that it had a solids content of 22% and a viscosity of 300 cps. The results of 7 runs are set forth in Table 4.

TABLE 2

Characterization of Spheres Formed with Use of a Spray Nozzle
(Sprayed into a two-phase kerosene-aqueous ammonia column)

| SPHERE SIZE DISTRIBUTION | | PHYSICAL PROPERTIES OF SPHERES | | | |
|---|---|---|---|---|---|
| Size Range Mesh No. | Weight Percent Distribution | Sphere Diameter Average (cm.) | Bulk Density (g./cm.³) | Average Crush Strength (kg.) | Strength Factor K | Geometric Surface Area Per Unit Volume (cm.²/cm.³) |
| −6+7 | 1.8 | 0.288 | 0.421 | 3.27 | 374 | 10.9 |
| −7+8 | 16.7 | 0.249 | 0.428 | 2.90 | 437 | 13.6 |
| −8+10 | 29.1 | 0.208 | 0.428 | 2.04 | 441 | 15.8 |
| −10+12 | 28.2 | 0.186 | 0.419 | 1.63 | 450 | 19.2 |
| −12+14 | 15.5 | 0.156 | 0.422 | 1.13 | 440 | 23.6 |
| −14+16 | 6.8 | 0.131 | 0.428 | 0.77 | 419 | 25.6 |
| −16+18 | 1.4 | 0.108 | 0.425 | 0.50 | 403 | 28.3 |
| −18+20 | 0.4 | 0.097 | 0.408 | 0.36 | 375 | 33.0 |

TABLE 4

Small Spheres Produced by Spray Drying Alumina Slurries

| | Spray Drying Conditions | | | | Size Distribution (weight percent) | | | | Bulk Density |
|---|---|---|---|---|---|---|---|---|---|
| Run | Atomizing Air Pressure psig | Slurry Feed Rate g/min. | Inlet Temp. °F. | Mesh: mm: | −40+60 (0.42–0.25) | −60+100 (0.25–0.149) | −100+200 (0.149–0.074) | −200* (0.074) | After 3 hrs. at 1000° F. (g/cm³) |
| 4-1 | 15 | 230 | 500 | | 0 | 8 | 55 | 37 | 0.60 |
| 4-2 | 15 | 230 | 500 | | 2 | 5 | 60 | 33 | — |

TABLE 4-continued
Small Spheres Produced by Spray Drying Alumina Slurries

| | Spray Drying Conditions | | | Size Distribution (weight percent) | | | | Bulk Density |
|---|---|---|---|---|---|---|---|---|
| Run | Atomizing Air Pressure psig | Slurry Feed Rate g/min. | Inlet Temp. °F. | Mesh: mm: −40+60 (0.42-0.25) | −60+100 (0.25-0.149) | −100+200 (0.149-0.074) | −200* (0.074) | After 3 hrs. at 1000° F. (g/cm³) |
| 4-3 | 15 | 250 | 600 | 0 | 4 | 52 | 44 | — |
| 4-4 | 5 | 230 | 500 | 6 | 32 | 44 | 18 | — |
| 4-5 | 15 | 310 | 500 | 4 | 16 | 63 | 17 | — |
| 4-6 | 5 | 240 | 600 | 4 | 32 | 50 | 13 | — |
| 4-7 | 5 | 300 | 600 | 18 | 48 | 27 | 7 | — |

*This fraction was analyzed by a Leeds and Northrup Microtrac particle size analyzer. The analysis showed that this fraction contained particles as small as 0.005 mm.

EXAMPLE 5

In this example the attrition loss of the small spheroids is measured.

The test is similar to the attrition test described in the Sanchez et al U.S. Pat. No. 4,179,408 in column 21, but it has been modified to take into consideration the initial size of the particles which are tested.

A set volume (60 cc.) of material to be tested is placed in an inverted Erlenmeyer flask of special construction which is connected to a metal orifice inlet. A large (one inch) outlet covered with screening is located on the flat side (bottom) of the flask. The mesh size of the screening depends upon the test particle size. The mesh size is about one-half of the minimum size of the test particles as illustrated in the Table below. N.B.S. screen numbers are used for mesh sizes.

| Attrition Test Screen Relationships | | | |
|---|---|---|---|
| Particle Size | | Attrition Screen Size | |
| mesh no. | mm. | mesh no. | mm. |
| −6+7 | 3.36-2.83 | 14 | 1.41 |
| −8+10 | 2.38-2.00 | 18 | 1.00 |
| −12+14 | 1.68-1.41 | 25 | 0.707 |
| −18+20 | 1.00-0.841 | 40 | 0.420 |
| −40+60 | 0.420-0.250 | 120 | 0.125 |
| −60+100 | 0.250-0.149 | 200 | 0.074 |
| −100+200 | 0.149-0.074 | 400 | 0.037 |

High velocity dry nitrogen gas is passed through the inlet orifice causing the particles to: (1) circulate over one another thus causing attrition, and (2) impact themselves in the top section of the flask thus breaking down as a function of strength. The material is tested for 5 minutes and the remaining particles are weighed. The loss in weight after testing expressed as a percent of the initial charge is designated the attrition loss.

The attrition test was done with two different size spheroid samples from the material of Example 2 as listed in Table 2. The samples were activated by heating them in air at 1000° F. for 3 hours. They were cooled in a dessicator to prevent moisture sorption and then subjected to the attrition test described above. Results are given below:

| Sphere Mesh Size | Gas Flow | Outlet Screen Size No. | Attrition Loss % |
|---|---|---|---|
| −14+16 | 2.0 cu.ft./min. | 40 | 0.3 |
| −16+20 | 2.0 cu.ft./min. | 40 | 0.1 |

Here the small spheroids have the same strong attrition resistance as the larger spheroids. Attrition is not a size dependent property. It depends more on surface texture and the strength of the chemical bonds.

It is understood that the foregoing detailed description is given merely by way of illustration and that many variations may be made therein without departing from the spirit of this invention.

What is claimed is:

1. A process for producing small spheroidal alumina particles in the size range of about 0.01 mm. to about 3.0 mm. comprising providing a slurry of an alumina and an acidic aqueous medium, spraying the slurry with an immiscible spraying fluid under nonatomizing conditions, aging the particles and drying and calcining the particles to produce alumina spheroids of small diameter.

2. The process of claim 1 wherein the spraying drying and calcining comprises
   (a) spraying the slurry with said spraying fluid downwardly through an immiscible fluid into an upper body of water-immiscible liquid and ammonia and into a lower body comprising aqueous ammonia to form spheroidal particles;
   (b) aging the particles in aqueous ammonia; and
   (c) drying and calcining the aged particles.

3. The process of claim 2, wherein the immiscible fluid is air.

4. The process of claim 2, wherein the alumina is a precipitated alumina.

5. The process of claim 2, wherein the calcined spheroids have a diameter of from about 0.1 mm. to about 2.0 mm.

6. A process for producing small spheroidal alumina particles in the size range of about 0.01 mm to about 0.4 mm comprising providing a slurry of an alumina and an acidic aqueous medium, aging the slurry, spray drying the slurry with an immiscible spraying fluid under nonatomizing conditions into heated air and drying and calcining the particles to produce alumina spheroids of small diameter.

7. The process of claim 6, wherein the particles have a size of about 0.05 mm. to about 0.25 mm.

8. A catalyst support comprising calcined spheroidal alumina particles having a total pore volume of about 0.8 to about 1.7 cubic centimeters per gram, a pore volume of about 0.5 to about 1.0 cubic centimeters per gram in pores of 100 to 1000 Angstrom units in diameter, a pore volume of about 0.1 to about 0.4 cubic centimeter per gram in pores of 1000 to 10,000 Angstrom units in diameter, a surface area of about 80 to about 135 square meters per gram, an average crush strength which exceeds the limit given by the following equation:

$$ACS \geq Kdr^2$$

UNITED STATES PATENT AND TRADEMARK OFFICE
CERTIFICATE OF CORRECTION

PATENT NO. : 4,392,987
DATED : July 12, 1983
INVENTOR(S) : Norman Raymond Laine, Jose Enrique Herrera It is certified that error appears in the above-identified patent and that said Letters Patent is hereby corrected as shown below:

In claim 2, line 1, insert a comma after "spraying".

Signed and Sealed this

Twentieth Day of September 1983

[SEAL]

Attest:

GERALD J. MOSSINGHOFF

Attesting Officer     Commissioner of Patents and Trademarks